US012466194B2

(12) United States Patent
Sato

(10) Patent No.: US 12,466,194 B2
(45) Date of Patent: Nov. 11, 2025

(54) THERMAL PRINTER

(71) Applicant: TOSHIBA TEC KABUSHIKI KAISHA, Tokyo (JP)

(72) Inventor: Yoji Sato, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 18/339,968

(22) Filed: Jun. 22, 2023

(65) Prior Publication Data

US 2024/0424807 A1 Dec. 26, 2024

(51) Int. Cl.
*B41J 2/365* (2006.01)
*B41J 2/32* (2006.01)
*B41J 2/325* (2006.01)
*B41J 2/335* (2006.01)

(52) U.S. Cl.
CPC ................. *B41J 2/365* (2013.01); *B41J 2/32* (2013.01); *B41J 2/325* (2013.01); *B41J 2/335* (2013.01)

(58) Field of Classification Search
CPC ..... B41J 2/365; B41J 2/335; B41J 2/32; B41J 2/325
See application file for complete search history.

(56) References Cited

U.S. PATENT DOCUMENTS 5,718,525 A * 2/1998 Bruhnke ................ B41J 3/4075 400/586
2006/0158506 A1* 7/2006 Naito ....................... B41J 2/355 347/180
2009/0009579 A1 1/2009 Yamazaki

FOREIGN PATENT DOCUMENTS

JP 2009255458 A * 11/2009 .............. B41J 33/26
JP 2022-051416 A 3/2022
WO WO-9402320 A1 * 2/1994 ................ B41J 2/32

* cited by examiner

*Primary Examiner* — Yaovi M Ameh
(74) *Attorney, Agent, or Firm* — FOLEY & LARDNER LLP

(57) ABSTRACT

A thermal printer that forms an image on a medium by a thermal head having a heat generating element includes a temperature sensor configured to measure a temperature of the thermal head; a head lifting motor configured to switch the thermal head between a head down state in which the thermal head can form an image on the medium and a head up state in which the thermal head is separated from the medium; and an MPU configured to determine whether a measurement temperature measured by the temperature sensor is less than a predetermined temperature threshold and cause the heat generating element to generate heat by switching the thermal head to a head up state by the head lifting motor, if the measurement temperature is less than the temperature threshold.

14 Claims, 7 Drawing Sheets

THERMAL PRINTER

FIELD

Embodiments described herein relate generally to a thermal printer.

BACKGROUND

In the related art, a thermal printer prints on a medium with a thermal head having heat generating elements. Thermal printers include those that perform printing by a direct thermal recording printing method and those that perform printing by a thermal transfer method. In the direct thermal recording printing method, printing is performed by heating a medium that changes color due to heat with a thermal head. In the thermal transfer method, printing is performed by heating ink with a thermal head. If such thermal printers are used in low temperature environments, print qualities may be degraded.

DETAILED DESCRIPTION

Figure 1:
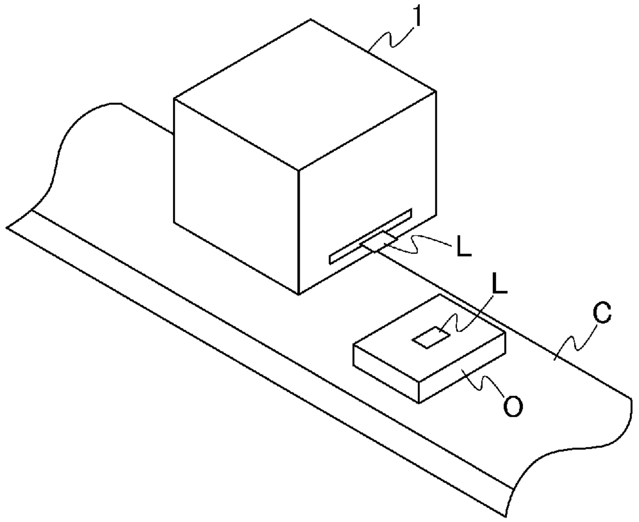
FIG. 1 is a schematic perspective view illustrating a thermal printer according to a first embodiment.

The problem to be solved by at least one embodiment is to provide a technique that can ensure print qualities even in a low temperature environment.

In general, according to at least one embodiment, a thermal printer that forms an image on a medium by a thermal head having a heat generating element includes a temperature sensor configured to measure a temperature of the thermal head; a switching unit (switch) configured to switch the thermal head between a head down state in which the thermal head can form an image on the medium and a head up state in which the thermal head is separated from the medium; and a processor configured to determine whether a measurement temperature measured by the temperature sensor is less than a predetermined temperature threshold and cause the heat generating element to generate heat by switching the thermal head to a head up state by the switching unit, if the measurement temperature is less than the temperature threshold.

Hereinafter, embodiments of the present disclosure are described with reference to the drawings. In each figure, the same reference numerals are given to the same configurations.

First Embodiment (Configuration of Thermal Printer)

Figure 2:
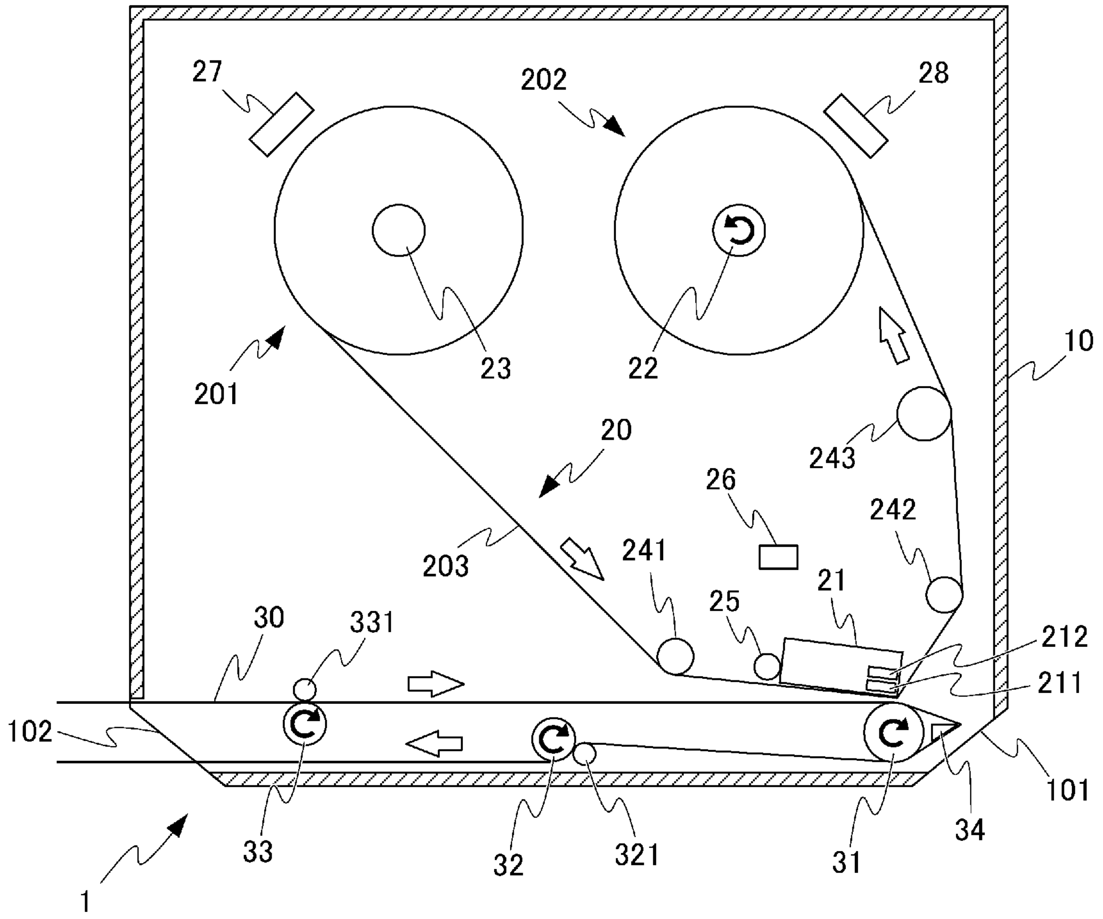
FIG. 2 is a schematic longitudinal sectional view schematically illustrating an internal configuration of the thermal printer.
Figure 3:
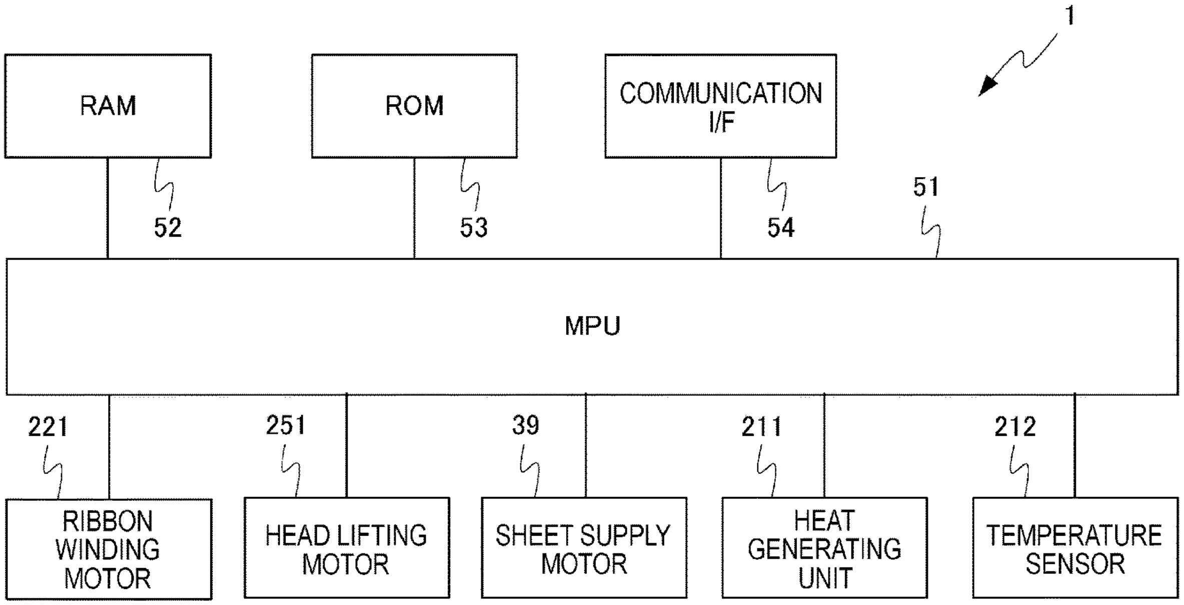
FIG. 3 is a block diagram illustrating a configuration of a control system of the thermal printer.

FIG. 1 illustrating a configuration of a printer according to an embodiment is a schematic perspective view illustrating a thermal printer according to at least one embodiment. FIG. 2 is a schematic longitudinal sectional view schematically illustrating an internal configuration of the thermal printer according to at least one embodiment. FIG. 3 is a block diagram illustrating a configuration of a control system of the thermal printer according to at least one embodiment. In addition, in FIG. 2, the internal configuration of a thermal printer 1 viewed from the side is illustrated, and only a cut surface of a housing 10 is illustrated.

As illustrated in FIG. 1, the thermal printer 1 according to at least one embodiment is used as an in-line printer installed in a workplace or the like. Specifically, in the present embodiment, the thermal printer 1 is fixedly installed with respect to a conveyance device C that conveys an object O and performs printing on a label L attached to the object O. The label L is supplied to the thermal printer 1 by another device (not illustrated). Similarly, the label L printed by the thermal printer 1 is attached to the object O by another device (not illustrated).

As illustrated in FIG. 2, the thermal printer 1 is a thermal transfer printer that transfers ink to the label L by heat. The thermal printer 1 includes the housing 10, a thermal head 21, a ribbon winding shaft 22, a ribbon support shaft 23, a plurality of guide rollers 241, 242, and 243, a head support shaft 25, a head lifting sensor 26, an unwinding ribbon sensor 27, a winding ribbon sensor 28, a platen roller 31, a peeling roller 32, a facing roller 321, a capstan roller 33, a facing roller 331, and a peeling bar 34.

Further, as illustrated in FIG. 3, the thermal printer 1 includes a ribbon winding motor 221, a head lifting motor 251, a sheet supply motor 39, a micro processor unit (MPU) 51, a random access memory (RAM) 52, a read only memory (ROM) 53, and a communication interface (I/F) 54.

The housing 10 is formed in a substantially box-shaped shape that defines an internal space that contains the components described above. A label discharge port 101 and a sheet supply and discharge port 102 are formed in the housing 10. The label discharge port 101 is an opening formed by cutting a side on a front side (right side in FIG. 2) positioned on the bottom side of the housing 10. The sheet supply and discharge port 102 is an opening formed to cut a side on a rear side (left side in FIG. 2) positioned on the bottom side of the housing 10. A sheet 30 to which a plurality of labels L are continuously attached is supplied from the sheet supply and discharge port 102. Each of the plurality of labels L attached to the sheet 30 is discharged from the label discharge port 101. The sheet 30 from which the label L is peeled off is discharged from the sheet supply and discharge port 102.

As illustrated in FIG. 2, the ribbon support shaft 23 rotatably and pivotally supports an ink ribbon 20 covered with a belt-shaped member coated with ink in a roller shape. Hereinafter, a portion covered in a roller shape in the ink ribbon 20 is referred to as a first roller portion 201, and the belt-shaped ink ribbon 20 released from the first roller portion 201 is referred to as a belt-shaped portion 203. The ribbon winding shaft 22 is forwardly rotated (rotated in a counterclockwise direction in FIG. 2) by the ribbon winding motor 221 and winds the belt-shaped portion 203 released from the first roller portion 201 in a roller shape again. A portion where the belt-shaped portion 203 is wound in a roller shape on the ribbon winding shaft 22 is referred to as a second roller portion 202. The ribbon support shaft 23 and the ribbon winding shaft 22 are provided at the same position in the vertical direction. The ribbon support shaft 23 is positioned on the rear side of the ribbon winding shaft 22.

The belt-shaped portion 203 released from the first roller portion 201 reaches the thermal head 21 via a guide roller 241 positioned behind the thermal head 21. In addition, the belt-shaped portion 203 reaches the second roller portion 202 via a guide roller 242 positioned front and above the thermal head 21 from the thermal head 21 and via a guide roller 243 positioned above and behind the guide roller 242. In this way, the belt-shaped portion 203 is crawled from the ribbon support shaft 23 to the ribbon winding shaft 22 via the plurality of guide rollers 241 to 243. As a result, the belt-shaped portion 203 is in a moderately tense state without applying a load to the thermal head 21.

The thermal head 21 is provided below the ribbon support shaft 23 and the ribbon winding shaft 22. The thermal head 21 has a heat generating unit 211 and a temperature sensor 212. The belt-shaped portion 203 released from the first roller portion 201 is wound around the ribbon winding shaft 22 via the thermal head 21 as described above. The heat generating unit 211 is provided near the belt-shaped portion 203 via the thermal head 21, specifically at the lower front end portion of the thermal head 21. The heat generating unit 211 has a plurality of heat generating elements adjacent to each other in the width direction of the label L. The plurality of heat generating elements generate heat in response to the input pulse wave, and thus the thermal head 21 transfers the ink coating the ink ribbon to the label L to form an image (characters, numbers, or figures such as barcodes). The temperature sensor 212 measures the temperature of the thermal head 21 and is configured as a thermistor provided on the thermal head 21 in at least one embodiment.

The head support shaft 25 is provided on the rear side of the thermal head 21 and is connected to the thermal head 21 to pivotally support the thermal head 21. The head support shaft 25 can swing the thermal head 21 in a vertical direction by being rotated by the head lifting motor 251.

Figure 4:
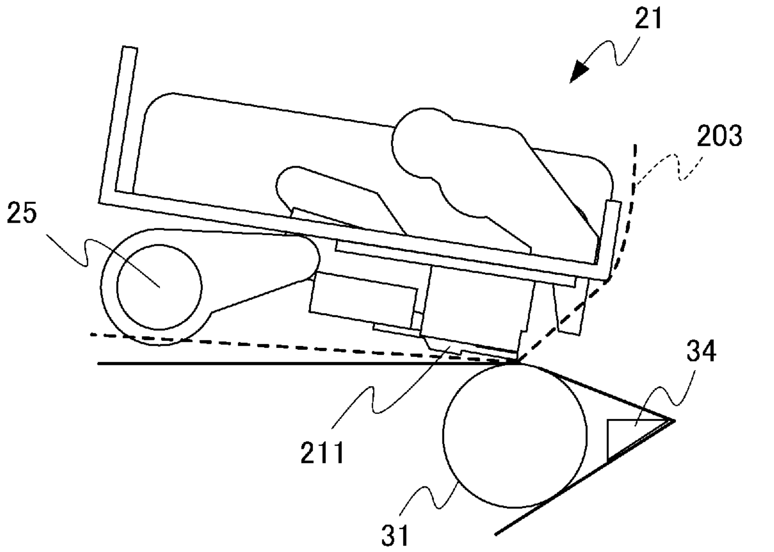
FIG. 4 is a diagram illustrating a head up state of the thermal printer.
Figure 5:
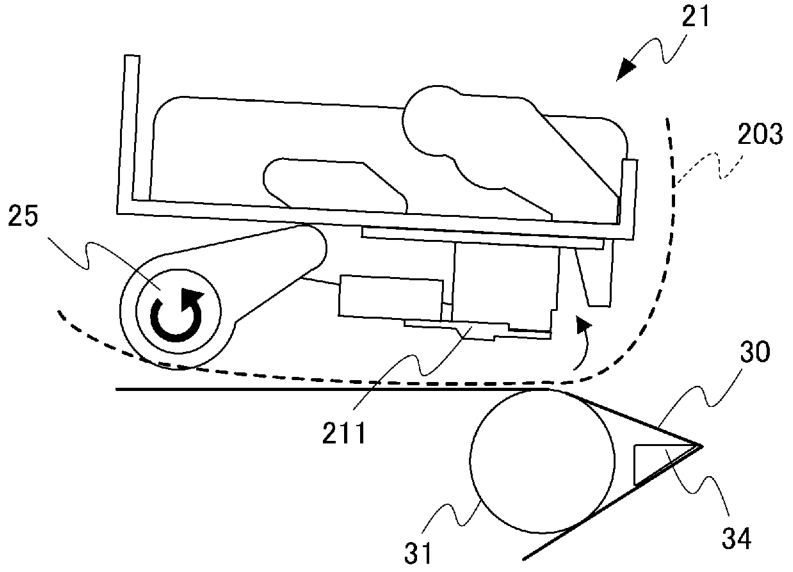
FIG. 5 is a diagram illustrating a head down state of the thermal printer.

FIG. 4 is a diagram illustrating a head up state of the thermal printer according to at least one embodiment. FIG. 5 is a diagram illustrating a head down state of the thermal printer.

The thermal head 21 can be switched between the head down state illustrated in FIG. 4 and the head up state illustrated in FIG. 5 by the head lifting motor 251 and the head support shaft 25. In other words, the head lifting motor 251 and the head support shaft 25 function as a switching unit (switch) that switches the thermal head 21 between the head down state and the head up state.

In the head down state, the heat generating unit 211 of the thermal head 21 is in contact with the belt-shaped portion 203. Also, in other words, in the head down state, the belt-shaped portion 203 is interposed between the heat generating unit 211 and the sheet 30 or the label L, so the heat generating unit 211 approaches the sheet 30 (label L) without contact. In this head down state, the thermal printer 1 is in a state of capable of printing on the label L using the ink ribbon 20. In at least one embodiment, the thermal printer 1 is in the head down state even before the power is turned on. In the head up state, the heat generating unit 211 of the thermal head 21 is in a state of being separated from the belt-shaped portion 203 or the sheet 30. The thermal printer 1 is switched from the head down state to the head up state mainly under predetermined conditions according to at least one embodiment. Switching to the head up state is specifically described below.

The head lifting sensor 26 is a non-contact sensor provided above the thermal head 21. The thermal head 21 is separated from the head lifting sensor 26 in the head down state and approaches the head lifting sensor 26 in the head up state. The head lifting sensor 26 detects the lifting state of the thermal head 21 in response to the contact or separation of the thermal head 21.

The unwinding ribbon sensor 27 is a non-contact sensor provided near the ribbon support shaft 23. The unwinding ribbon sensor 27 is separated from the first roller portion 201 of the ink ribbon 20 to the extent that it does not come into contact with the first roller portion 201 and measures the distance from the first roller portion 201. The diameter of the first roller portion 201 decreases as the ink ribbon 20 is released, that is, as the printing progresses. Therefore, it is possible to know the consumption amount of the ink ribbon 20 from the measured distance.

The winding ribbon sensor 28 is a non-contact sensor provided near the ribbon winding shaft 22. The winding ribbon sensor 28 is separated from the second roller portion 202 of the ink ribbon 20 to the extent that it does not come into contact with the second roller portion 202 and measures the distance from the second roller portion 202. The diameter of the second roller portion 202 increases as the ink ribbon 20 is wound. Therefore, it is possible to know the consumption amount of the ink ribbon 20 from the measured distance. Based on the distances measured by each of the unwinding ribbon sensor 27 and the winding ribbon sensor 28, it is possible to know the consumption amount of the ink ribbon 20 more accurately than when only one of the unwinding ribbon sensor 27 and the winding ribbon sensor 28 is used.

As illustrated in FIG. 2, the capstan roller 33 is provided on the rear side of the platen roller 31 and the peeling roller 32. The capstan roller 33 conveys the sheet 30 supplied from the sheet supply and discharge port 102 to the front side where the thermal head 21 is positioned. The sheet 30 conveyed by the capstan roller 33 is positioned above the capstan roller 33 so that the back surface to which the plurality of labels L are not attached is in contact with the capstan roller 33. The facing roller 331 is provided so as to face the capstan roller 33 with the sheet 30 therebetween. The capstan roller 33 cooperates with the facing roller 331 to pinch and convey the sheet 30.

The platen roller 31 is positioned on the front side of the capstan roller 33 and the peeling roller 32 and configured to press the label L against the thermal head 21. The platen roller 31 conveys the sheet 30 to the front side where the label discharge port 101 is provided on its upper side and also conveys the sheet 30 to the rear side where the sheet supply and discharge port 102 is provided on the lower side thereof.

The peeling bar 34 is positioned on the front side of the platen roller 31 and is provided near the label discharge port 101. The peeling bar 34 is formed in a long length equal to or greater than the width of the label L, and a corner is formed at the front side end throughout the entire longitudinal direction. The sheet 30 conveyed to the front side is folded so as to be conveyed to the rear side with the corner portion of the peeling bar 34 as a base point. The peeling bar 34 discharges the printed label L from the label discharge port 101 by protruding forward from the back surface of the sheet 30.

The peeling roller 32 is positioned between the platen roller 31 and the capstan roller 33 in the front-rear direction. The peeling roller 32 conveys the sheet 30 from which the label L is peeled off to the rear side where the sheet supply and discharge port 102 is positioned. The sheet 30 conveyed to the peeling roller 32 is positioned under the peeling roller 32 so that the back surface is in contact with the peeling roller 32. The facing roller 321 is provided so as to face the peeling roller 32 with the sheet 30 therebetween. The peeling roller 32 cooperates with the facing roller 321 to pinch and convey the sheet 30. The sheet supply motor 39 rotates the platen roller 31, the peeling roller 32, and the capstan roller 33.

The communication I/F 54 communicates with the higher-level device of the thermal printer 1. The MPU 51 cooperates with the RAM 52 to control the ribbon winding motor 221, the head lifting motor 251, the sheet supply motor 39, and the heat generating unit 211 and forms the image received from the higher-level device on the label L. Furthermore, prior to image formation on the label L, the MPU 51 executes an adjustment process for controlling the ribbon winding motor 221 and the head lifting motor 251 based on the temperature measured by the temperature sensor 212. The ROM 53 stores programs and data used for processing by the MPU 51. The data stored in the ROM 53 includes a ribbon adjustment table. Details of the ribbon adjustment table are described below.

(Operation of Adjustment Process)

Figure 6:
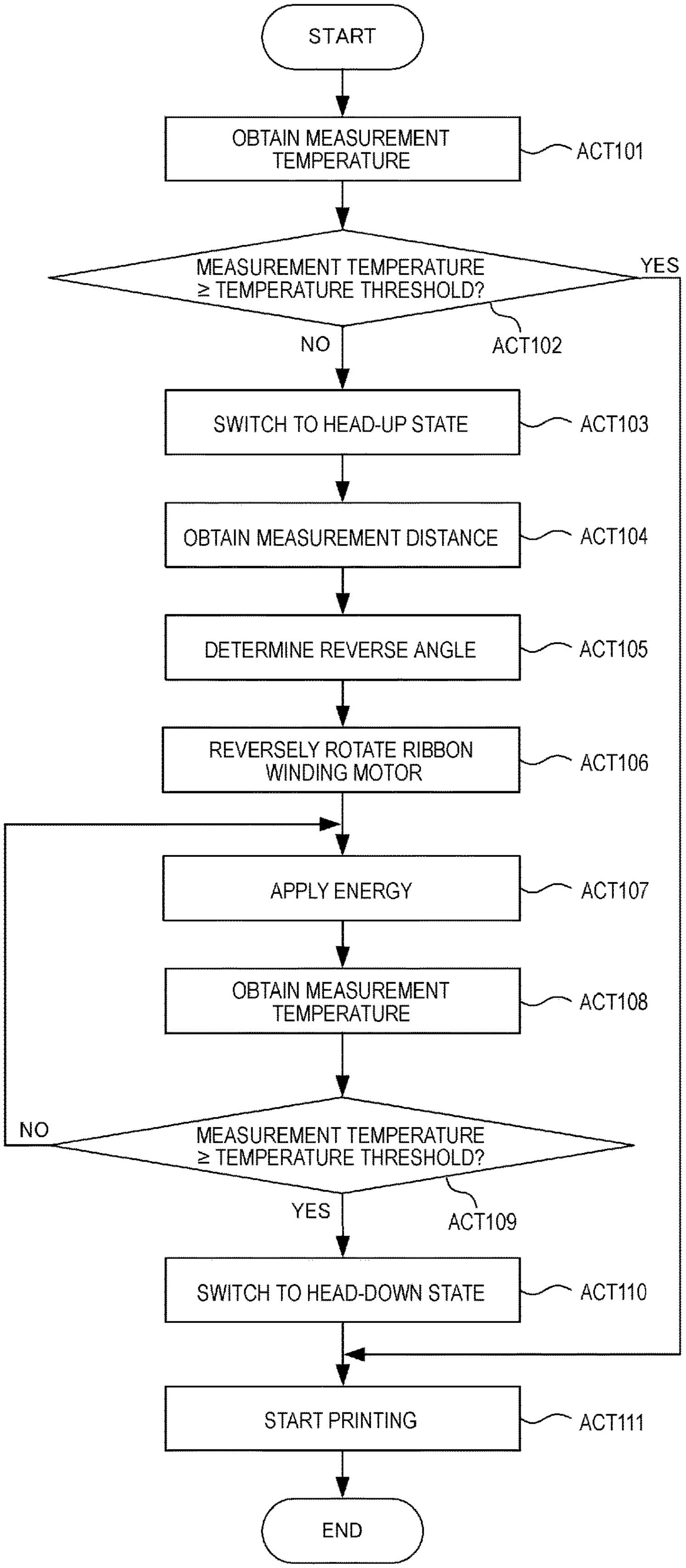
FIG. 6 is a flowchart illustrating an operation of an adjustment process.

The operation of the adjustment process according to at least one embodiment is described. FIG. 6 is a flowchart illustrating an operation of the adjustment process according to at least one embodiment. Note that the adjustment process illustrated in FIG. 6 is triggered by the user performing an operation to start printing after the thermal printer 1 started operating.

As illustrated in FIG. 6, the MPU 51 first obtains the measurement temperature measured by the temperature sensor 212 as the temperature of the thermal head 21 (ACT 101). Next, the MPU 51 determines whether the obtained measured temperature is a preset temperature threshold or higher (ACT 102). Here, the temperature threshold is the temperature at which the thermal printer 1 can print on the label L without causing printing failure. The temperature threshold is set, for example, at 5° C. The temperature threshold can be changed as appropriate.

If the measured temperature is less than the temperature threshold (ACT 102, NO), the MPU 51 drives the head lifting motor 251 to switch the thermal head 21 to the head up state (ACT 103). At this time, the MPU 51 preferably obtains the detection result from the head lifting sensor 26 and determines whether the head is surely lifted up. If it is determined in this determination that the head is not lifted up, it is preferable to inform the user that there is an error by means of a buzzer or the like.

After switching to the head up state, the MPU 51 obtains the measurement distance measured by the winding ribbon sensor 28 (ACT 104). Next, the MPU 51 determines the reverse angle of the ribbon winding motor 221 based on the obtained measurement distance and the ribbon adjustment table (ACT 105). The ribbon adjustment table is data in which a reverse angle, which is a rotation angle in a reverse rotation direction, is associated with each of the plurality of measurement distances. In other words, the ribbon adjustment table associates the rotation direction and the rotation angle of the ribbon winding motor 221 with each measurement distance. The reverse rotation direction is the rotation direction (clockwise direction in FIG. 2) opposite to the rotation direction of the forward rotation in which the ribbon winding motor 221 winds the ink ribbon 20. The reverse angle is the rotation angle (the rotation angle of the ribbon winding shaft 22) when rotating the ribbon winding motor 221 in this reverse rotation direction. Therefore, if the ribbon winding motor 221 is reversely rotated by the reverse angle, the ink ribbon 20, particularly the belt-shaped portion 203, is loosened.

Since the belt-shaped portion 203 is in a moderately tense state as described above, it follows the thermal head 21 and moves upward if the thermal head 21 is in the head up state. In the present embodiment, as described below, energy is applied to the heat generating unit 211 of the thermal head 21 to heat the heat generating unit 211 in the head up state. Therefore, if the belt-shaped portion 203 moves upward following the thermal head 21, there is a possibility that it will come into contact with the heat generating unit 211. In the present embodiment, at least the belt-shaped portion 203 near the thermal head 21 can be loosened by reversely rotating the ribbon winding motor 221. That is, it is possible to avoid contact of the belt-shaped portion 203 with the heat generating unit 211.

The reverse angle of the ribbon winding motor 221 may be a constant numerical value. However, the diameter of the second roller portion 202 wound on the ribbon winding shaft 22 increases as the printing progresses. Therefore, if the reverse angle is a constant numerical value, there is a possibility that the belt-shaped portion 203 is not in a favorable loose state. Here, the favorable loose state is, for example, a state in which the heat generating unit 211 of the thermal head 21 and the belt-shaped portion 203 are sufficiently separated from each other, as illustrated in FIG. 5. In order to avoid sliding on the sheet 30, the belt-shaped portion 203 is preferably slightly separated from the sheet 30 as well.

Considering the above points, it is more preferable to change the reverse angle of the ribbon winding motor 221 in response to the diameter of the second roller portion 202. In at least one embodiment, the reverse angle is changed in response to the diameter of the second roller portion 202 so that the belt-shaped portion 203 can be maintained in a favorable loose state regardless of the progress of printing. Specifically, in the ribbon adjustment table, reverse angles are associated respectively with the plurality of values of the measurement distances so that the reverse angles decrease as the values of the measurement distance increase.

After determining the reverse angle, the MPU 51 reversely rotates the ribbon winding motor 221 based on the determined reverse angle to loosen the belt-shaped portion 203 (ACT 106). Next, the MPU 51 applies a predetermined amount of energy to the thermal head 21, that is, inputs a pulse wave having a pulse width in response to the predetermined amount of energy to the heat generating unit 211 to generate heat (ACT 107). The amount of energy to be applied may be variable in response to the value of the measurement temperature, for example, the higher amount of energy may be applied, as the lower the measurement temperature. After the heat is generated, the MPU 51 obtains again the measurement temperature measured by the temperature sensor 212 as the temperature of the thermal head 21 (ACT 108).

Next, the MPU 51 determines whether the obtained measurement temperature is a preset temperature threshold or higher (ACT 109). Here, the temperature threshold here is the temperature threshold used in the determination process of ACT 102. If the measured temperature is less than the temperature threshold (ACT 102, NO), the process proceeds to ACT 107 to continue applying energy.

Meanwhile, if the measurement temperature is the temperature threshold or higher (ACT 109, YES), the MPU 51 drives the head lifting motor 251 to switch the thermal head 21 to the head down state (ACT 110). At this time, the MPU 51 preferably obtains the detection result from the head lifting sensor 26 and determines whether the head is surely lowered down. If it is determined in this determination that the head is not lowered down, the user may be informed that there is an error by means of a buzzer or the like. After switching to the head down state, the MPU 51 starts printing on the label L of the sheet 30 (ACT 111). The amount of energy applied to the heat generating unit 211 at the start of printing is lower than the amount of energy applied in the process of ACT 107. In other words, in the process of ACT 107, by applying an amount of energy higher than the energy for normal printing, the heat generating unit 211 can be brought to an appropriate temperature for printing at an early stage.

Also, in the determination of ACT 102, if the measurement temperature is the temperature threshold or higher (ACT 102, YES), the MPU 51 starts printing (ACT 111).

According to at least one embodiment described above, if the temperature is less than the temperature threshold at the start of printing, the thermal head 21 can be switched to the head up state to cause the heat generating unit 211 to generate heat. For example, a thermal printer that does not have the features of at least one embodiment repeats printing while applying high energy until the temperature of the heat generating unit of the thermal head reaches an appropriate temperature in a low temperature environment or the like. As a result, the print density is adjusted, and the print qualities are ensured. In this method, in a low temperature environment such as −5° C., which exceeds the print density adjustment area, many labels L are wasted until the print qualities are ensured.

However, according to the thermal printer 1 according to at least one embodiment, the heat generating unit 211 can generate heat until the temperature reaches the appropriate temperature for printing without actually printing. Therefore, even in a low temperature environment, it is possible to ensure print qualities while suppressing consumption of the label L. Also, the thermal head 21 is separated from the ink ribbon 20 by lifting up the head. Therefore, contact of the heat generating unit 211 with the ink ribbon 20 can be avoided, and a situation in which the ink ribbon 20 is consumed can be avoided.

Also, in at least one embodiment, energy is applied to the heat generating unit 211 in a head up state in which the heat generating unit 211 is separated from the ink ribbon 20. Therefore, a relatively large amount of energy can be applied, and the temperature of the heat generating unit 211 can be brought to a temperature equal to or higher than the temperature threshold, that is, a temperature appropriate for printing, for example, in a short period of time such as 1 to 2 seconds. Therefore, it is possible to quickly ensure print qualities even in a low temperature environment.

Furthermore, according to at least one embodiment, the ink ribbon 20 can be loosened while the thermal head 1 is lifted up. Thereby, contact between the heat generating unit 211 of the thermal head 21 and the ink ribbon 20 can be reliably avoided.

In at least one embodiment, the thermal printer 1 performs printing by the thermal transfer method, but may perform printing by the direct thermal recording printing method in which the heat generating unit 211 develops colors on direct color paper such as thermal paper. In this case, since the ink ribbon 20 is not required, the process of ACT 107 is performed, for example, after the process of ACT 103 in FIG. 6. Further, in this case, the belt-shaped portion 203 is not interposed between the heat generating unit 211 and the sheet 30 or the label L in the head down state. Therefore, the heat generating unit 211 is in direct contact with the sheet 30 or the label L in the head down state.

In addition, the adjustment process according to at least one embodiment is triggered by the user performing an operation to start printing after the thermal printer 1 is operated. However, the adjustment process may be performed after the operation of the thermal printer 1, for example, immediately after turning on the power. In this case, after ACT 110 in FIG. 6, the printing process of ACT 111 is not executed, and the thermal printer 1 is in a standby state to wait for an input operation to start printing from the user.

Also, the ratio of the reverse angle corresponding to the measurement distance may be set as the ribbon adjustment table. In this case, in ACT 105 of FIG. 6, the reverse angle corresponding to the measurement distance obtained based on the set ratio is calculated by the MPU 51.

Second Embodiment (Device Configuration)

Figure 7:
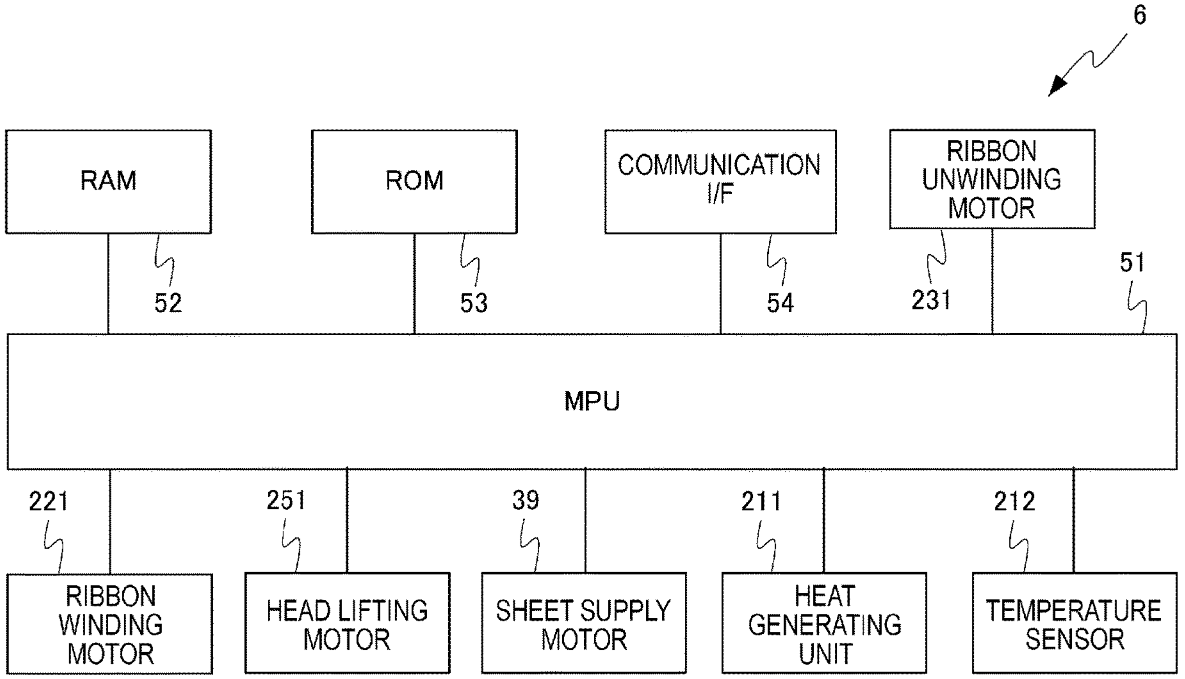
FIG. 7 is a block diagram illustrating a configuration of a control system of a thermal printer according to a second embodiment.

FIG. 7 is a block diagram illustrating a configuration of a control system of a thermal printer according to the present embodiment. As illustrated in FIG. 7, a thermal printer 6 according to at least one embodiment differs from the thermal printer 1 according to the first embodiment in that a ribbon unwinding motor 231 that can be controlled by the MPU 51 is further included.

The ribbon unwinding motor 231 forwardly rotates in synchronization with the ribbon winding motor 221. Therefore, the ribbon support shaft 23 according to at least one embodiment is rotated forwardly (rotated in a counterclockwise direction in FIG. 2) by the ribbon unwinding motor 231, thereby releasing the belt-shaped portion 203 from the first roller portion 201.

In this thermal printer 6, a ribbon adjustment table is generated based on the diameter of the first roller portion 201. Specifically, in the ribbon adjustment table according to at least one embodiment, the rotation angle (forward rotation angle) of the ribbon unwinding motor 231 in the forward rotation direction corresponding to the measurement distance of the unwinding ribbon sensor 27 is associated. Hereinafter, the ribbon adjustment table according to at least one embodiment is referred to as a second ribbon adjustment table, and the ribbon adjustment table used in the first embodiment is referred to as a first ribbon adjustment table.

(Operation of Adjustment Process)

The adjustment process according to the present embodiment is different from the adjustment process according to the first embodiment in the contents of ACTS 104 to 106 in FIG. 6. In ACT 104, the MPU 51 obtains the measurement distance measured by the unwinding ribbon sensor 27. In ACT 105, the MPU 51 determines the forward rotation angle of the ribbon unwinding motor 231 based on obtained measurement distance and the second ribbon adjustment table. In ACT 106, the MPU 51 forwardly rotates the ribbon unwinding motor 231 based on the determined forward rotation angle to loosen the belt-shaped portion 203.

According to at least one embodiment described above, by controlling the ribbon unwinding motor 231 based on the second ribbon adjustment table, the same effect as in the case of controlling the ribbon winding motor 221 based on the first ribbon adjustment table can be exhibited.

In addition, in at least one embodiment, it is described that the measurement distance and the forward rotation angle of the ribbon unwinding motor 231 are associated with each other in the second ribbon adjustment table. However, this is because the belt-shaped portion 203 can be released from the first roller portion 201 by the forward rotation of the ribbon unwinding motor 231. If the ink ribbon 20 is installed so that the belt-shaped portion 203 is released from the first roller portion 201 by the reverse rotation of the ribbon unwinding motor 231, naturally, the measurement distance and the reverse angle of the ribbon unwinding motor 231 are associated with each other in the second ribbon adjustment table. The same is also applied to the first ribbon adjustment table.

If the measurement distance of any one of the unwinding ribbon sensor 27 and the winding ribbon sensor 28 can be obtained, it should be noted that the diameters of the first roller portion 201 and the second roller portion 202 can be estimated. Therefore, at least one of the ribbon winding motor 221 and the ribbon unwinding motor 231 may be controlled based on the measurement result of at least one of the unwinding ribbon sensor 27 and the winding ribbon sensor 28. In this case, for example, the reverse angle of the ribbon winding motor 221 may be associated with the measurement distance of the unwinding ribbon sensor 27 in the first ribbon adjustment table. Similarly, in the second ribbon adjustment table, the forward rotation angle of the ribbon unwinding motor 231 may be associated with the measurement distance of the winding ribbon sensor 28. That is, the ribbon winding motor 221 and/or the ribbon unwinding motor 231 may be controlled based on the measurement distance obtained from the unwinding ribbon sensor 27 and/or the winding ribbon sensor 28 and the first and/or second ribbon adjustment table. In particular, if the thermal printer includes the ribbon winding motor 221 and the ribbon unwinding motor 231, based on the first and second ribbon adjustment tables, the ribbon winding motor 221 and the ribbon unwinding motor 231 are preferably rotated in the direction of loosening the belt-shaped portion 203 of the ink ribbon 20.

Third Embodiment (Device Configuration)

Figure 8:
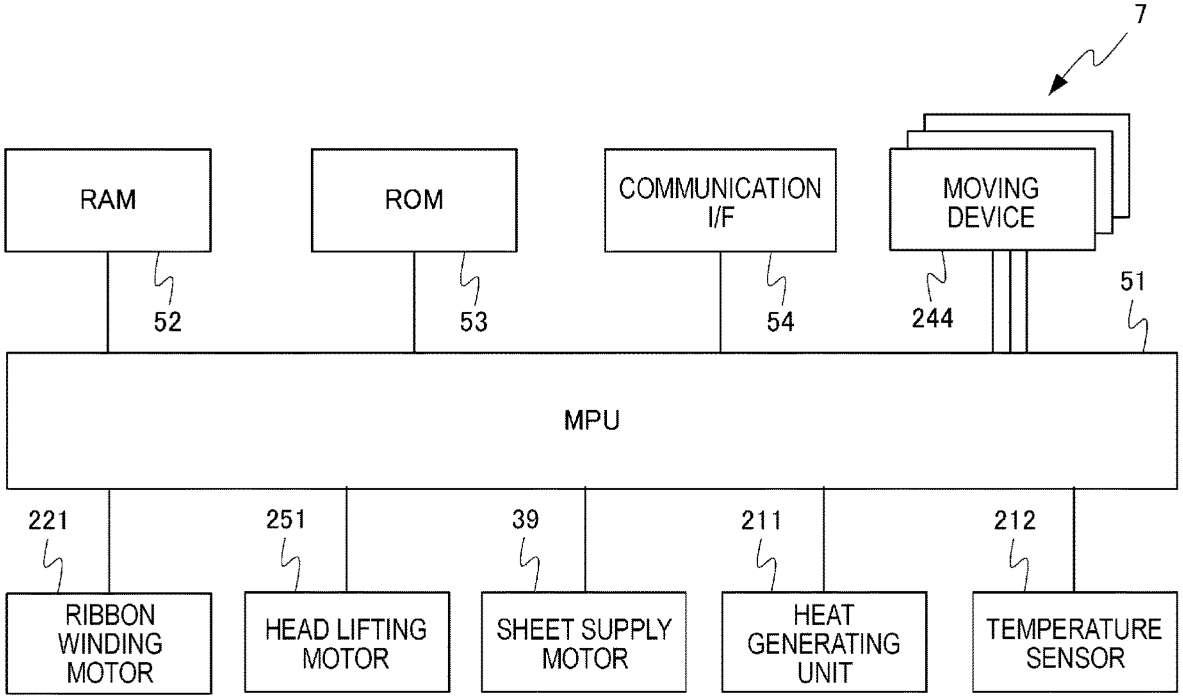
FIG. 8 is a block diagram illustrating a configuration of a control system of a thermal printer according to a third embodiment.
Figure 9:
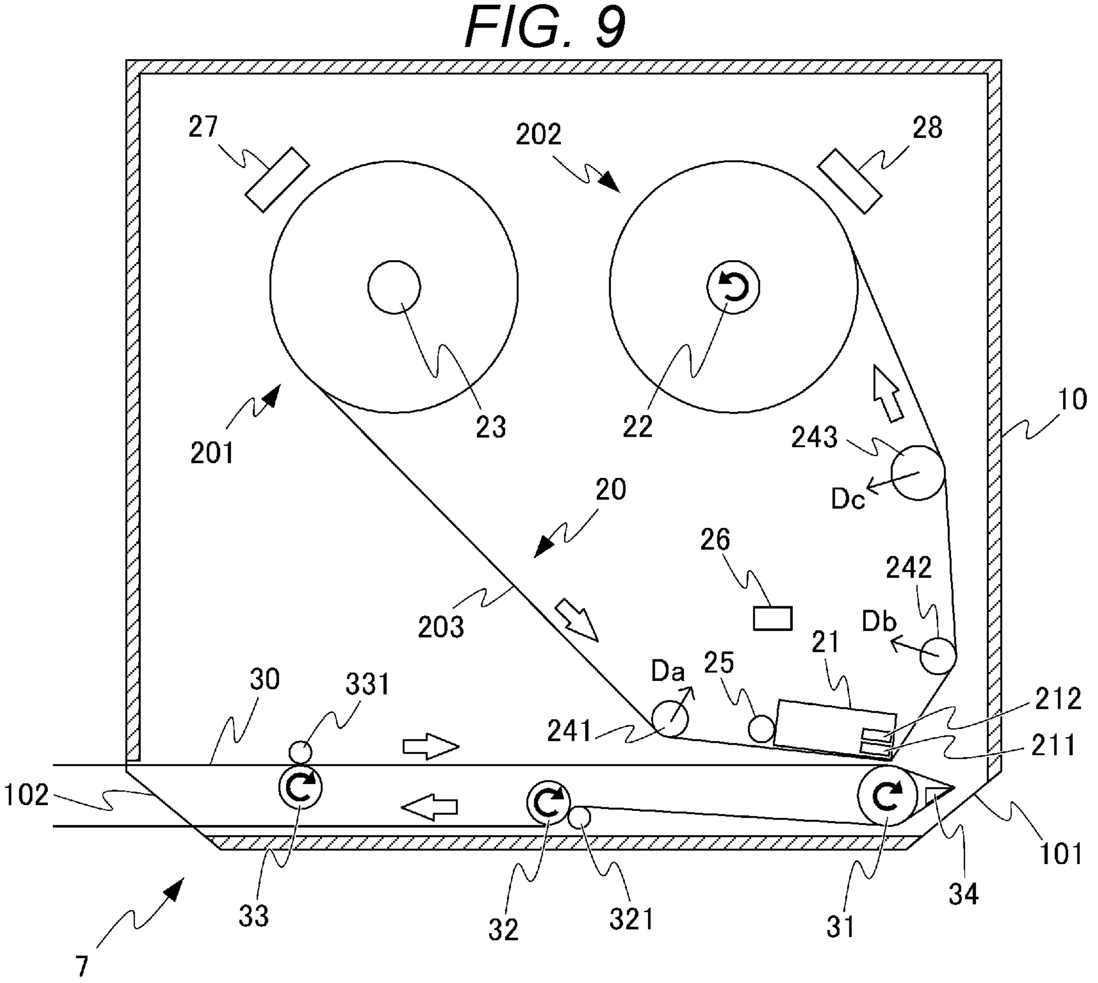
FIG. 9 is a schematic longitudinal sectional view schematically illustrating an internal configuration of the thermal printer.

FIG. 8 is a block diagram illustrating a configuration of a control system of a thermal printer according to the present embodiment. FIG. 9 is a schematic longitudinal sectional view schematically illustrating an internal configuration of the thermal printer according to the present embodiment. Note that FIG. 9 illustrates the internal configuration of a thermal printer 7 viewed from a side, and only the cut surface of the housing 10 is illustrated.

As illustrated in FIG. 8, the thermal printer 7 according to at least one embodiment is different from the thermal printer 1 according to the first embodiment in that three moving devices 244 that can be controlled by the MPU 51 are further included. Each of the three moving devices 244 is provided corresponding to each of the guide rollers 241 to 243 and reciprocates the corresponding guide roller along a predetermined moving direction. For example, the moving device 244 supports the rotation shaft of the corresponding guide roller. The moving devices 244 can move the corresponding guide roller in a direction of being separated from a tangent to the belt-shaped portion 203 of the corresponding guide roller, preferably in a direction of being separated perpendicularly. Examples of the moving device 244 include a device such as a solenoid that can convert electrical energy into reciprocating linear motion.

In other words, each of the guide rollers 241 to 243 is configured to be movable in a direction of being separated from the belt-shaped portion 203. For example, the guide roller 241 can be reciprocated by the moving device 244 in the direction indicated by a reference numeral Da in FIG. 9. The guide roller 242 can be reciprocated by the moving device 244 in the direction indicated by a reference numeral Db in FIG. 9. The guide roller 243 can be reciprocated by the moving device 244 in a direction indicated by a reference numeral Dc in FIG. 9.

The guide rollers 241 to 243 have the function of causing the belt-shaped portion 203 of the ink ribbon 20 to be in a tense state. Therefore, the guide rollers 241 to 243 are moved in a direction of being separated respectively from the contacts with the belt-shaped portion 203, so that the belt-shaped portion 203 can be loosened. That is, by moving the guide rollers 241 to 243 in the head up state of the thermal head 21, the same effect as if the ribbon winding motor 221 is rotated in the reverse direction can be achieved.

(Operation of Adjustment Process)

Figure 10:
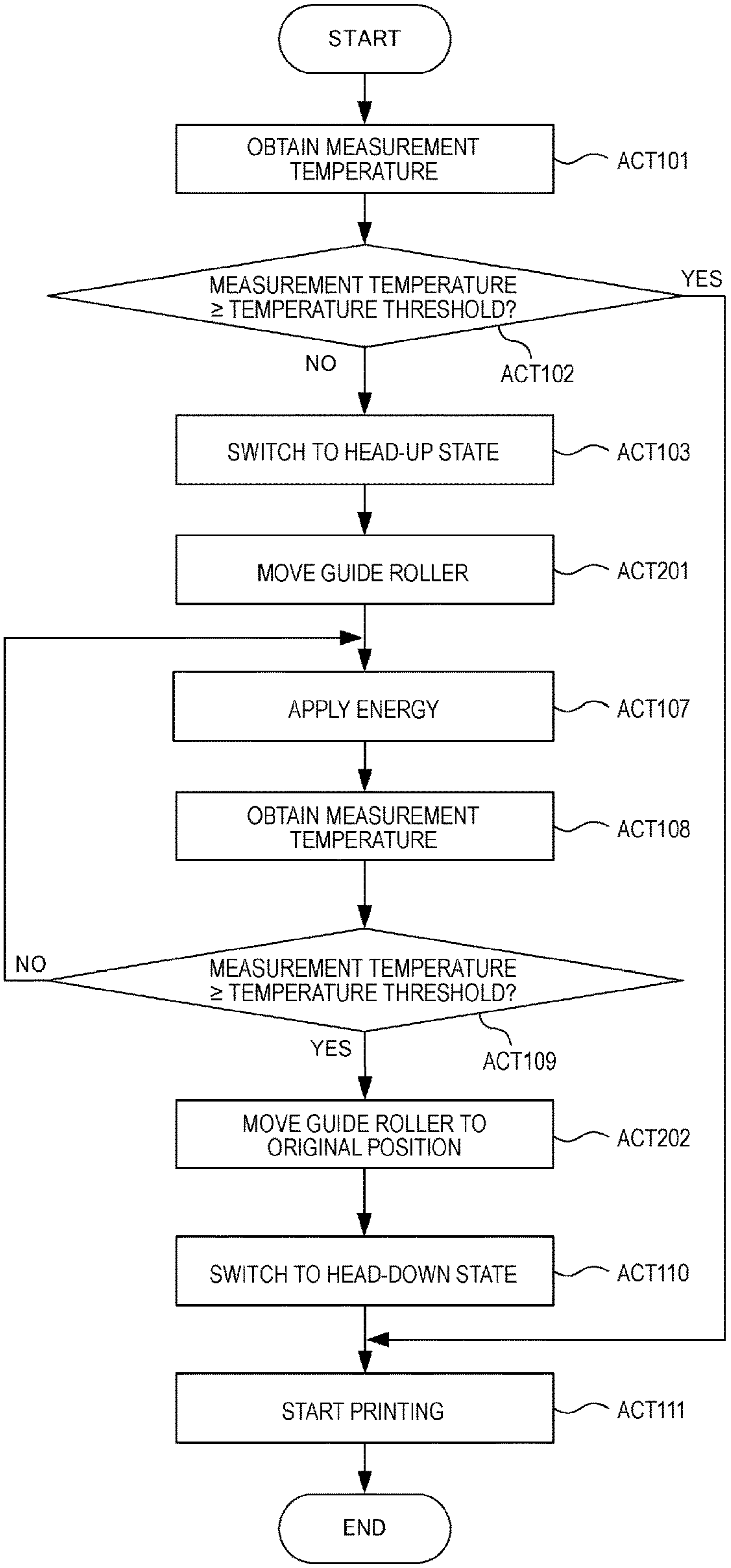
FIG. 10 is a flowchart illustrating an operation of an adjustment process.

The operation of the adjustment process according to at least one embodiment is described. FIG. 10 is a flowchart illustrating an operation of the adjustment process according to at least one embodiment. The adjustment process according to at least one embodiment is different from the adjustment process according to the first embodiment in that ACT 201 is executed instead of ACTS 104 to 106, and ACT 202 is newly executed after the determination process of ACT 109.

In ACT 201, the MPU 51 causes the three moving devices 244 to move the guide rollers 241 to 243 along predetermined moving directions. By the corresponding movement, the belt-shaped portion 203 can be loosened as described above. In ACT 202, the MPU 51 returns the moved guide rollers 241 to 243 to the original positions before the movement by the three moving devices 244.

According to at least one embodiment described above, by moving the guide rollers 241 to 243 in the direction of being separated from the belt-shaped portion 203, the ink ribbon 20, particularly the belt-shaped portion 203, can be loosened. Therefore, even if the thermal head 21 is in the head up state, the belt-shaped portion 203 can be reliably separated from the heat generating unit 211.

In at least one embodiment, it is described that the guide rollers 241 to 243 are moved in the movement direction. However, a new guide roller different from the guide rollers 241 to 243 may be provided and moved in the movement direction by a new moving device 244 as well. A new guide roller is preferably provided near the thermal head 21, such as near the rear end portion of the thermal head 21. When providing new guide rollers, the guide rollers 241 to 243 may be immovably fixed.

The heat generating unit 211 according to at least one embodiment corresponds to, for example, a heat generating element. The ribbon winding shaft 22 according to at least one embodiment corresponds to, for example, a winding shaft, and the ribbon support shaft 23 corresponds to, for example, an unwinding shaft. The moving device 244 according to at least one embodiment corresponds to, for example, a moving unit, and a head lifting motor 251 corresponds to, for example, a switching unit. The winding ribbon sensor 28 according to at least one embodiment corresponds to, for example, a winding sensor, and the unwinding ribbon sensor 27 corresponds to, for example, an unwinding sensor.

While certain embodiments have been described, these embodiments have been presented by way of example only, and are not intended to limit the scope of the disclosures. Indeed, the novel embodiments described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A thermal printer configured to form an image on a medium by a thermal head using a belt-shaped ink ribbon, the thermal head having a heat generating element, the printer comprising:
- a temperature sensor configured to measure a temperature of the thermal head;
- a switch configured to switch the thermal head between a head down state and a head up state, wherein in the head down state the thermal head is configured to form an image on the medium and in the head up state the thermal head is separated from the medium;
- a winding shaft configured to wind the ink ribbon by rotating the ink ribbon in one direction after the image is formed on the medium;
- an unwinding shaft configured to support the ink ribbon in a releasable manner before the image is formed on the medium;
- a winding sensor configured to measure a diameter of the ink ribbon in a roller shape wound around the winding shaft; and
- a processor configured to:
  - determine whether a measurement temperature measured by the temperature sensor is less than a predetermined temperature threshold,
  - cause the heat generating element to generate heat by switching the thermal head to the head up state by the switch, when the measurement temperature is less than the temperature threshold, and
  - separate the belt-shaped ink ribbon and the thermal head from each other by rotating at least one of the winding shaft or the unwinding shaft so that the ink ribbon is loosened based on a measurement result of the winding sensor when the thermal head is in the head up state.

2. The printer according to claim 1,
wherein the processor is configured to:
- determine whether a measurement temperature of a separation state measured when the thermal head is in the head up state is the temperature threshold or more, and
- swing the thermal head to a reference position by the switch when the measurement temperature in the separation state is the temperature threshold or more.

3. The printer according to claim 1,
wherein the processor is configured to:
- refer to a table in which a diameter of the ink ribbon, a rotation direction of the winding shaft, and a rotation angle are associated with each other, and
- rotate the winding shaft based on a rotation angle corresponding to a measurement result of the winding sensor.

4. The printer according to claim 1, further comprising:
- an unwinding sensor configured to measure a diameter of the ink ribbon in a roller shape wound around the unwinding shaft,
- wherein the processor is configured to rotate at least one of the winding shaft or the unwinding shaft based on a measurement result of the unwinding sensor so that the ink ribbon is loosened.

5. The printer according to claim 4,
wherein the processor is configured to:
- refer to a table in which a diameter of the ink ribbon, a rotation direction of the unwinding shaft, and a rotation angle are associated with each other, and
- rotate the unwinding shaft based on a rotation angle corresponding to the measurement result of the unwinding sensor.

6. The printer according to claim 1, further comprising:
- a guide roller configured to guide the ink ribbon to be conveyed to a predetermined direction; and
- a moving unit configured to move the guide roller in a direction of being separated from the ink ribbon,
- wherein, when the thermal head is in the head up state, the processor moves the guide roller by the moving unit so that the ink ribbon is loosened.

7. The printer according to claim 1,
wherein the temperature sensor is a thermistor incorporated into the thermal head.

8. The printer according to claim 1, wherein the thermal printer includes a thermal transfer printer.

9. The printer according to claim 1, wherein the switch includes a head lifting motor and a head support shaft.

10. A method of operating a thermal printer, the thermal printer configured to form an image on a medium by a thermal head using a belt-shaped ink ribbon, the thermal head having a heat generating element, the method comprising:
- supporting, by an unwinding shaft, the ink ribbon in a releasable manner before the image is formed on the medium;
- winding, by a winding shaft, the ink ribbon by rotating the ink ribbon in one direction after the image is formed on the medium;
- measuring a temperature of the thermal head via a temperature sensor;
- measuring a diameter of the ink ribbon in a roller shape wound around the winding shaft;
- switching the thermal head between a head down state and a head up state, wherein in the head down state the thermal head is configured to form an image on the medium and in the head up state the thermal head is separated from the medium by rotating at least one of the winding shaft or the unwinding shaft to loosen the belt-shaped ink ribbon based on a measurement result of the winding sensor;
- determining whether a measurement temperature measured by the temperature sensor is less than a predetermined temperature threshold; and
- causing the heat generating element to generate heat by switching the thermal head to a head up state when the measurement temperature is less than the temperature threshold.

11. The method according to claim 10, further comprising:

determining whether a measurement temperature of a separation state measured when the thermal head is in the head up state is the temperature threshold or more, and swinging the thermal head to a reference position when the measurement temperature in the separation state is the temperature threshold or more.

12. The method according to claim 10, wherein the temperature sensor is a thermistor incorporated into the thermal head.

13. The method according to claim 10, wherein the thermal printer includes a thermal transfer printer.

14. A thermal printer configured to form an image on a medium, the printer comprising:

a thermal head including a heat generating element;

an ink ribbon;

a motor configured to control a tension on the ink ribbon;

a temperature sensor configured to measure a temperature of the thermal head;

a winding shaft configured to wind the ink ribbon by rotating the ink ribbon in one direction after the image is formed on the medium;

an unwinding shaft configured to support the ink ribbon in a releasable manner before the image is formed on the medium;

a winding sensor configured to measure a diameter of the ink ribbon in a roller shape wound around the winding shaft;

a switch configured to switch the thermal head between a head down state and a head up state, wherein in the head down state the thermal head is configured to form an image on the medium and in the head up state the thermal head is separated from the medium; and a processor configured to:

determine whether a measurement temperature measured by the temperature sensor is less than a predetermined temperature threshold, and in response to a determination that the measurement temperature is less than the temperature threshold, both (a) control the switch to switch the thermal head to the head up state and (b) control the motor based on a measurement result of the winding sensor to separate the ink ribbon from the thermal head by rotating at least one of the winding shaft or the unwinding shaft to reduce the tension on the ink ribbon.

* * * * *